United States Patent
Kim et al.

(10) Patent No.: US 11,104,341 B2
(45) Date of Patent: Aug. 31, 2021

(54) LANE CHANGE CONTROLLER FOR VEHICLE SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventors: Jun Soo Kim, Seoul (KR); Jin Su Jeong, Suwon-si (KR); Jae Yong Jeon, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 227 days.

(21) Appl. No.: 16/269,140

(22) Filed: Feb. 6, 2019

(65) Prior Publication Data

US 2019/0315363 A1 Oct. 17, 2019

Related U.S. Application Data

(60) Provisional application No. 62/655,831, filed on Apr. 11, 2018.

(30) Foreign Application Priority Data

Nov. 23, 2018 (KR) .......................... 10-2018-0146722

(51) Int. Cl.
*B60W 30/18* (2012.01)
*B60W 40/06* (2012.01)
(Continued)

(52) U.S. Cl.
CPC ...... *B60W 30/18163* (2013.01); *B60W 40/06* (2013.01); *B60W 50/14* (2013.01);
(Continued)

(58) Field of Classification Search
CPC ........... B60W 30/18163; B60W 40/06; B60W 50/14; B60W 2555/60; B60W 2552/05;
(Continued)

(56) References Cited

U.S. PATENT DOCUMENTS

| | | |
|---|---|---|
| 5,521,579 A | 5/1996 | Bernhard |
| 6,055,467 A | 4/2000 | Mehring et al. |

(Continued)

FOREIGN PATENT DOCUMENTS

| | | |
|---|---|---|
| DE | 198 21 122 A1 | 6/1999 |
| DE | 101 14 187 A1 | 9/2002 |

(Continued)

OTHER PUBLICATIONS

European Search Report dated Mar. 27, 2020 from the corresponding European Application No. 19167264.1, 8 pages.
(Continued)

*Primary Examiner* — Calvin Cheung
(74) *Attorney, Agent, or Firm* — Brinks Gilson & Lione

(57) ABSTRACT

A lane change controller, a system including the same, and a method thereof are provided. The lane change controller includes a processor configured to determine whether it is possible for a vehicle to perform a lane change depending on a road condition, based on information about surrounding circumstances, a storage storing the result of determining whether it is possible to perform the lane change, the result being determined by the processor, and a display device configured to display the result of determining whether it is possible to perform the lane change.

19 Claims, 5 Drawing Sheets

(51) Int. Cl.
  *B60W 50/14* (2020.01)
  *G06K 9/00* (2006.01)
  *G08G 1/16* (2006.01)
(52) U.S. Cl.
  CPC ......... *G06K 9/00798* (2013.01); *G08G 1/167* (2013.01); *B60W 2050/146* (2013.01); *B60W 2552/05* (2020.02); *B60W 2555/60* (2020.02)
(58) Field of Classification Search
  CPC ........ B60W 2050/146; G06K 9/00798; G08G 1/167
  See application file for complete search history.

(56) References Cited

U.S. PATENT DOCUMENTS

| | | |
|---|---|---|
| 6,473,678 B1 | 10/2002 | Satoh et al. |
| 6,842,687 B2 | 1/2005 | Winner et al. |
| 7,363,140 B2 | 4/2008 | Ewerhart et al. |
| 7,821,421 B2 | 10/2010 | Tamir et al. |
| 8,073,595 B2 | 12/2011 | Tabata et al. |
| 8,457,827 B1 | 6/2013 | Ferguson et al. |
| 8,521,352 B1 | 8/2013 | Ferguson et al. |
| 8,798,841 B1 | 8/2014 | Nickolaou et al. |
| 8,874,301 B1 | 10/2014 | Rao et al. |
| 9,315,178 B1 | 4/2016 | Ferguson et al. |
| 9,527,441 B2 | 12/2016 | Matsumura |
| 9,874,871 B1 | 1/2018 | Zhu et al. |
| 10,183,668 B2 | 1/2019 | Takae |
| 10,324,463 B1 | 6/2019 | Konrardy et al. |
| 10,449,856 B2 | 10/2019 | Kojima |
| 10,451,730 B2 | 10/2019 | Talamonti et al. |
| 10,558,213 B2 | 2/2020 | Sato et al. |
| 10,618,523 B1 | 4/2020 | Fields et al. |
| 10,627,813 B2 | 4/2020 | Tsuji et al. |
| 10,663,971 B2 | 5/2020 | Sugawara et al. |
| 10,676,084 B2* | 6/2020 | Fujii ................. B60W 30/0953 |
| 10,814,913 B2 | 10/2020 | Fujii |
| 10,935,974 B1 | 3/2021 | Fields et al. |
| 2003/0163239 A1 | 8/2003 | Winner et al. |
| 2005/0137782 A1 | 6/2005 | Shinada |
| 2005/0228588 A1 | 10/2005 | Braeuchle et al. |
| 2005/0256630 A1 | 11/2005 | Nishira et al. |
| 2006/0009910 A1 | 1/2006 | Ewerhart et al. |
| 2007/0043505 A1 | 2/2007 | Leicht |
| 2007/0255474 A1 | 11/2007 | Hayakawa et al. |
| 2008/0172153 A1 | 7/2008 | Ozaki et al. |
| 2008/0204212 A1 | 8/2008 | Jordan et al. |
| 2009/0005933 A1 | 1/2009 | Tabata et al. |
| 2009/0088925 A1 | 4/2009 | Sugawara et al. |
| 2009/0132125 A1 | 5/2009 | Yonezawa et al. |
| 2009/0171533 A1 | 7/2009 | Kataoka |
| 2009/0194350 A1 | 8/2009 | Rattapon et al. |
| 2009/0299573 A1 | 12/2009 | Thrun et al. |
| 2009/0319113 A1 | 12/2009 | Lee |
| 2010/0010733 A1 | 1/2010 | Krumm |
| 2010/0042282 A1 | 2/2010 | Taguchi et al. |
| 2010/0289632 A1* | 11/2010 | Seder ................. G02B 27/01 340/436 |
| 2011/0169625 A1 | 7/2011 | James et al. |
| 2011/0196592 A1 | 8/2011 | Kashi et al. |
| 2011/0241862 A1 | 10/2011 | Debouk et al. |
| 2011/0251758 A1 | 10/2011 | Kataoka |
| 2011/0293145 A1* | 12/2011 | Nogami ................. G06T 11/00 382/103 |
| 2012/0166032 A1 | 6/2012 | Lee et al. |
| 2012/0296522 A1 | 11/2012 | Otuka |
| 2013/0063595 A1 | 3/2013 | Niem |
| 2013/0066525 A1 | 3/2013 | Tomik et al. |
| 2013/0226406 A1 | 8/2013 | Ueda et al. |
| 2014/0074356 A1 | 3/2014 | Bone |
| 2015/0006012 A1 | 1/2015 | Kammel et al. |
| 2015/0006013 A1 | 1/2015 | Vvimmer et al. |
| 2015/0019063 A1 | 1/2015 | Lu et al. |
| 2015/0094899 A1 | 4/2015 | Hackenberg et al. |
| 2015/0148985 A1 | 5/2015 | Jo |
| 2015/0166062 A1 | 6/2015 | Johnson et al. |
| 2015/0204687 A1* | 7/2015 | Yoon .................. G01C 21/3647 701/436 |
| 2015/0353082 A1 | 12/2015 | Lee et al. |
| 2015/0355641 A1 | 12/2015 | Choi et al. |
| 2015/0360721 A1 | 12/2015 | Matsuno et al. |
| 2016/0001781 A1 | 1/2016 | Fung et al. |
| 2016/0091897 A1 | 3/2016 | Nilsson et al. |
| 2016/0107682 A1 | 4/2016 | Tan et al. |
| 2016/0107687 A1 | 4/2016 | Yamaoka |
| 2016/0187879 A1 | 6/2016 | Mere et al. |
| 2016/0225261 A1 | 8/2016 | Matsumoto |
| 2016/0250968 A1 | 9/2016 | Shirakata et al. |
| 2016/0272204 A1 | 9/2016 | Takahashi et al. |
| 2016/0288707 A1 | 10/2016 | Matsumura |
| 2016/0297431 A1 | 10/2016 | Eigel et al. |
| 2016/0297447 A1 | 10/2016 | Suzuki |
| 2016/0339913 A1 | 11/2016 | Yamashita et al. |
| 2016/0349066 A1 | 12/2016 | Chung et al. |
| 2016/0368492 A1 | 12/2016 | Al-Stouhi |
| 2017/0003683 A1 | 1/2017 | Sato et al. |
| 2017/0061799 A1 | 3/2017 | Fujii et al. |
| 2017/0108865 A1 | 4/2017 | Rohde et al. |
| 2017/0124882 A1 | 5/2017 | Wang |
| 2017/0171375 A1 | 6/2017 | Kamata |
| 2017/0197637 A1 | 7/2017 | Yamada et al. |
| 2017/0203763 A1 | 7/2017 | Yamada et al. |
| 2017/0203764 A1 | 7/2017 | Fujiki et al. |
| 2017/0240172 A1 | 8/2017 | Nishiguchi |
| 2017/0240186 A1 | 8/2017 | Hatano |
| 2017/0243491 A1 | 8/2017 | Fujii et al. |
| 2017/0291603 A1 | 10/2017 | Nakamura |
| 2017/0313313 A1 | 11/2017 | Asakura |
| 2017/0315556 A1 | 11/2017 | Mimura |
| 2017/0334460 A1 | 11/2017 | Arakawa et al. |
| 2017/0341652 A1 | 11/2017 | Sugawara et al. |
| 2017/0341653 A1 | 11/2017 | Kubota et al. |
| 2017/0349212 A1 | 12/2017 | Oshida et al. |
| 2017/0368936 A1 | 12/2017 | Kojima |
| 2018/0009437 A1 | 1/2018 | Ooba |
| 2018/0029604 A1 | 2/2018 | Niino et al. |
| 2018/0033309 A1 | 2/2018 | Norwood |
| 2018/0043906 A1 | 2/2018 | Huang |
| 2018/0046185 A1 | 2/2018 | Sato et al. |
| 2018/0050659 A1 | 2/2018 | Coburn |
| 2018/0074497 A1 | 3/2018 | Tsuji et al. |
| 2018/0088574 A1 | 3/2018 | Latotzki et al. |
| 2018/0091085 A1 | 3/2018 | Tamagaki et al. |
| 2018/0111628 A1 | 4/2018 | Tamagaki et al. |
| 2018/0154939 A1 | 6/2018 | Aoki |
| 2018/0157038 A1* | 6/2018 | Kabe .................. G02B 5/3058 |
| 2018/0162416 A1 | 6/2018 | Honda et al. |
| 2018/0170370 A1 | 6/2018 | Kataoka |
| 2018/0178713 A1 | 6/2018 | Fujii |
| 2018/0178714 A1 | 6/2018 | Fujii |
| 2018/0178715 A1 | 6/2018 | Fujii |
| 2018/0178716 A1 | 6/2018 | Fujii |
| 2018/0178801 A1 | 6/2018 | Hashimoto et al. |
| 2018/0178802 A1 | 6/2018 | Miyata |
| 2018/0186376 A1 | 7/2018 | Lee et al. |
| 2018/0188735 A1 | 7/2018 | Sugawara et al. |
| 2018/0194280 A1 | 7/2018 | Shibata et al. |
| 2018/0197414 A1 | 7/2018 | Oooka |
| 2018/0209801 A1 | 7/2018 | Stentz et al. |
| 2018/0215387 A1 | 8/2018 | Takae |
| 2018/0222422 A1 | 8/2018 | Takae |
| 2018/0222423 A1 | 8/2018 | Takae et al. |
| 2018/0237030 A1 | 8/2018 | Jones et al. |
| 2018/0239352 A1 | 8/2018 | Wang et al. |
| 2018/0251155 A1* | 9/2018 | Chan ................. G08G 1/167 |
| 2018/0281788 A1 | 10/2018 | Uchida |
| 2018/0290666 A1 | 10/2018 | Ichikawa et al. |
| 2018/0292820 A1 | 10/2018 | Markberger |
| 2018/0297638 A1 | 10/2018 | Fujii |
| 2018/0297639 A1 | 10/2018 | Fujii |
| 2018/0297640 A1 | 10/2018 | Fujii |
| 2018/0339708 A1 | 11/2018 | Geller |
| 2018/0345959 A1 | 12/2018 | Fujii |

(56) References Cited

U.S. PATENT DOCUMENTS

| | | |
|---|---|---|
| 2018/0345960 A1 | 12/2018 | Fujii |
| 2018/0345964 A1 | 12/2018 | Fujii et al. |
| 2018/0346027 A1 | 12/2018 | Fujii |
| 2018/0348758 A1 | 12/2018 | Nakamura et al. |
| 2018/0350242 A1 | 12/2018 | Fujii |
| 2018/0354519 A1 | 12/2018 | Miyata |
| 2018/0362013 A1 | 12/2018 | Ungermann |
| 2018/0370542 A1 | 12/2018 | Braunagel et al. |
| 2018/0370544 A1 | 12/2018 | Kitagawa |
| 2018/0373250 A1 | 12/2018 | Nakamura et al. |
| 2019/0005823 A1 | 1/2019 | Fujiki et al. |
| 2019/0026918 A1 | 1/2019 | Gomezcaballero et al. |
| 2019/0047469 A1 | 2/2019 | Nishiguchi et al. |
| 2019/0049958 A1 | 2/2019 | Liu et al. |
| 2019/0061766 A1 | 2/2019 | Nishiguchi |
| 2019/0071099 A1 | 3/2019 | Nishiguchi |
| 2019/0106108 A1 | 4/2019 | Wienecke et al. |
| 2019/0126923 A1 | 5/2019 | Taie et al. |
| 2019/0135290 A1 | 5/2019 | Marden et al. |
| 2019/0155279 A1 | 5/2019 | Tayama |
| 2019/0161117 A1 | 5/2019 | Suzuki |
| 2019/0185005 A1 | 6/2019 | Fukuda |
| 2019/0196481 A1 | 6/2019 | Tay et al. |
| 2019/0197497 A1 | 6/2019 | Abari et al. |
| 2019/0212443 A1 | 7/2019 | Nomura et al. |
| 2019/0235504 A1 | 8/2019 | Carter et al. |
| 2019/0241198 A1 | 8/2019 | Mori et al. |
| 2019/0256064 A1 | 8/2019 | Hecker et al. |
| 2019/0263411 A1 | 8/2019 | Saikyo et al. |
| 2019/0265712 A1 | 8/2019 | Satzoda et al. |
| 2019/0279507 A1 | 9/2019 | Oshisaka et al. |
| 2019/0283757 A1 | 9/2019 | Honda et al. |
| 2019/0285726 A1 | 9/2019 | Muto |
| 2019/0291642 A1 | 9/2019 | Chae et al. |
| 2019/0291728 A1 | 9/2019 | Shalev-Shwartz et al. |
| 2019/0302768 A1 | 10/2019 | Zhang et al. |
| 2019/0315362 A1 | 10/2019 | Um et al. |
| 2019/0317494 A1 | 10/2019 | Lee et al. |
| 2019/0325758 A1 | 10/2019 | Yoshii et al. |
| 2019/0359202 A1 | 11/2019 | Zhu et al. |
| 2019/0391580 A1 | 12/2019 | Di Cairano et al. |
| 2020/0001714 A1 | 1/2020 | Kojima |
| 2020/0073396 A1 | 3/2020 | Shimizu |
| 2020/0172123 A1 | 6/2020 | Kubota et al. |
| 2020/0180638 A1 | 6/2020 | Kanoh |
| 2020/0269747 A1 | 8/2020 | Kusayanagi et al. |
| 2020/0269880 A1 | 8/2020 | Tokita |
| 2020/0301431 A1 | 9/2020 | Matsubara et al. |
| 2020/0307634 A1 | 10/2020 | Yashiro |
| 2020/0312155 A1 | 10/2020 | Kelkar et al. |
| 2020/0391593 A1 | 12/2020 | Lee et al. |

FOREIGN PATENT DOCUMENTS

| | | |
|---|---|---|
| DE | 102004005815 B3 | 6/2005 |
| DE | 10 2004 048 468 A1 | 4/2006 |
| DE | 10 2007 005 245 A1 | 11/2007 |
| DE | 10 2011 016 7 | 11/2011 |
| DE | 10 2011 016 7 | 10/2012 |
| DE | 10 2012 001405 A1 | 11/2012 |
| DE | 10 2011 109618 A1 | 2/2013 |
| DE | 10 2012 008090 A1 | 10/2013 |
| DE | 10 2014 225 680 A1 | 6/2016 |
| DE | 10 2015 205131 A1 | 9/2016 |
| DE | 102016202946 A1 | 9/2016 |
| DE | 102015206969 A1 | 10/2016 |
| DE | 102015209476 A1 | 11/2016 |
| DE | 102015219231 A1 | 4/2017 |
| DE | 10 2016 007187 A1 | 6/2017 |
| DE | 102015224244 A1 | 6/2017 |
| DE | 10 2016 215565 A1 | 2/2018 |
| DE | 10 2016 216134 A1 | 3/2018 |
| EP | 1074904 A1 | 2/2001 |
| EP | 1607264 A1 | 12/2005 |
| EP | 2116984 A1 | 11/2009 |
| EP | 2657921 A1 | 10/2013 |
| EP | 2978648 A1 | 2/2016 |
| EP | 3075618 A2 | 10/2016 |
| EP | 3239960 A1 | 11/2017 |
| EP | 3 264 211 A1 | 1/2018 |
| EP | 3284646 A1 | 2/2018 |
| EP | 3075618 A3 | 5/2018 |
| JP | 2000-198458 A | 7/2000 |
| JP | 2003-025868 A | 1/2003 |
| JP | 2015-138330 A | 7/2015 |
| JP | 2016-000602 A | 1/2016 |
| JP | 2016-151815 A | 8/2016 |
| JP | 2016-196285 A | 11/2016 |
| JP | 2019-043169 A | 3/2019 |
| KR | 10-0578573 B | 11/2005 |
| KR | 101779823 B1 | 10/2017 |
| KR | 20180070401 A | 6/2018 |
| WO | 2010-088869 A1 | 8/2010 |
| WO | 2012-131405 A1 | 10/2012 |
| WO | 2014-154771 A1 | 10/2014 |
| WO | 2017-018133 A1 | 2/2017 |
| WO | WO 2017064941 A1 | 4/2017 |
| WO | 2017-168013 A1 | 10/2017 |
| WO | WO 2017168013 A1 | 10/2017 |
| WO | 2018-033389 A1 | 2/2018 |
| WO | 2017-017793 A1 | 6/2018 |

OTHER PUBLICATIONS

European Search Report dated Apr. 21, 2020 from the corresponding European Application No. 19167270.8, 8 pages.
U.S. Office Action dated Feb. 4, 2020 from the corresponding U.S. Appl. No. 16/296,890, 19 pages.
U.S. Office Action dated Mar. 25, 2020 from the corresponding U.S. Appl. No. 16/204,362 , 27 pages.
U.S. Office Action dated Apr. 24, 2020 from the corresponding U.S. Appl. No. 16/203,884 , 25 pages.
European Search Report dated Oct. 2, 2019 from the corresponding European Application No. 19163402.1, 10 pages.
European Search Report dated Oct. 2, 2019 from the corresponding European Application No. 19162795.9, 8 pages.
European Search Report dated Oct. 14, 2019 from the corresponding European Application No. 19161253.0, 11 pages.
European Search Report dated Oct. 18, 2019 from the corresponding European Application No. 19167268.2, 8 pages.
European Search Report dated Oct. 23, 2019 from the corresponding European Application No. 19167266.6, 9 pages.
U.S. Office Action for U.S. Appl. No. 16/204,362 dated Oct. 16, 2019, 32 pages.
European Search Report dated Jul. 1, 2019 from the corresponding European Application No. 18210398.6, 9 pages.
European Search Report dated Jul. 3, 2019 from the corresponding European Application No. 18210063.6, 10 pages.
European Search Report dated Jul. 18, 2019 from the corresponding European Application No. 18210400.0, 5 pages.
European Search Report dated Jul. 22, 2019 from the corresponding European Application No. 18210403.4, 8 pages.
European Search Report dated Jul. 22, 2019 from the corresponding European Application No. 18210401.8, 8 pages.
European Search Report dated Jul. 25, 2019 from the corresponding European Application No. 18209168.6, 9 pages.
European Search Report dated Jul. 25, 2019 from the corresponding European Application No. 19156387.3, 8 pages.
European Search Report dated Aug. 2, 2019 from the corresponding European Application No. 19167271.6, 8 pages.
European Search Report dated Aug. 22, 2019 from the corresponding European Application No. 19167263.3, 8 pages.
European Search Report dated Aug. 30, 2019 from the corresponding European Application No. 19167269.0, 9 pages.
European Search Report dated Aug. 30, 2019 from the corresponding European Application No. 19167267.4, 8 pages.
European Search Report dated May 11, 2020 from the corresponding European Application No. 19167265.8, 9 pages.

(56) References Cited

OTHER PUBLICATIONS

Office Action for U.S. Appl. No. 16/204,400 dated Jun. 1, 2020, 44 pages.
Notice of Allowance for U.S. Appl. No. 16/204,362 dated Jul. 9, 2020, 21 pages.
Office Action dated Aug. 12, 2020 from the corresponding U.S. Appl. No. 16/192,279, 60 pages.
Notice of Allowance dated Sep. 4, 2020 from the corresponding U.S. Appl. No. 16/203,884, 15 pages.
Office Action dated Sep. 15, 2020 from the corresponding U.S. Appl. No. 16/206,170, 23 pages.
Office Action dated Dec. 14, 2020 from the corresponding U.S. Appl. No. 16/378,203, 49 pp.
Notice of Allowance dated Dec. 28, 2020 from the corresponding U.S. Appl. No. 16/206,170, 16 pp.
Office Action dated Jan. 25, 2021 from the corresponding U.S. Appl. No. 16/192,279, 38 pp.
Notice of Allowance dated Jan. 25, 2021 from the corresponding U.S. Appl. No. 16/372,937, 31 pp.
Office Action dated Jan. 27, 2021 from the corresponding U.S. Appl. No. 16/299,547, 29 pp.
Office Action dated Feb. 11, 2021 from the corresponding U.S. Appl. No. 16/372,896, 26 pp.
Office Action dated Feb. 11, 2021 from the corresponding U.S. Appl. No. 16/376,661, 24 pp.
Office Action dated Feb. 17, 2021 from the corresponding U.S. Appl. No. 16/204,324, 30 pp.
Office Action dated Feb. 17, 2021 from the corresponding U.S. Appl. No. 16/376,576, 56 pp.
Office Action dated Mar. 17, 2021 from the corresponding U.S. Appl. No. 16/378,181, 14 pages.
Office Action dated Mar. 26, 2021 from the corresponding U.S. Appl. No. 16/376,612, 29 pp.
Office Action dated Apr. 15, 2021 from the corresponding U.S. Appl. No. 16/290,376, 27 pp.
Office Action dated Apr. 22, 2021 from the corresponding U.S. Appl. No. 16/378,203, 35 pp.
Notice of Allowance dated May 19, 2021 from the corresponding U.S. Appl. No. 16/204,324, 13 pp.
Office Action dated May 21, 2021 from the corresponding U.S. Appl. No. 16/372,896, 19 pp.
Notice of Allowance dated May 27, 2021 from the corresponding U.S. Appl. No. 16/376,661, 10 pp.
Office Action dated Jun. 1, 2021 from the corresponding U.S. Appl. No. 16/192,279, 39 pp.
Non Final Office Action, dated Jun. 11, 2021, in U.S. Appl. No. 16/372,966.
Non-Final Office Action dated Jun. 22, 2021 from corresponding U.S. Appl. No. 16/367,433, 16 pages.
Final Office Action dated Jul. 14, 2021 from corresponding U.S. Appl. No. 16/376,576, 50 pages.
Final Office Action dated Jul. 19, 2021 from corresponding U.S. Appl. No. 16/299,547, 21 pages.
Final Office Action dated Jul. 23, 2021 from corresponding U.S. Appl. No. 16/378,181, 18 pages.

* cited by examiner

LANE CHANGE CONTROLLER FOR VEHICLE SYSTEM INCLUDING THE SAME, AND METHOD THEREOF

CROSS-REFERENCE TO RELATED APPLICATION

The present application claims priority to and the benefit of Korean Patent Application No. 10-2018-0146722, filed in the Korean Intellectual Property Office on Nov. 23, 2018 and U.S. Patent Application No. 62/655,831, filed in the US Patent and Trademark Office on Apr. 11, 2018, the entire contents of which are incorporated herein by reference.

TECHNICAL FIELD

The present disclosure relates to a lane change controller for a vehicle, a system including the same, and a method thereof, and more particularly, relates to technologies of determining a condition of a road on which a vehicle is currently traveling and activating a lane change control system of the vehicle.

BACKGROUND

The statements in this section merely provide background information related to the present disclosure and may not constitute prior art.

Recently, with the rapid development of information technology (IT), there has been a growing interest in intelligent vehicles integrated with vision systems. Particularly, advanced safety vehicle technology, such as lane departure, lane keeping, a collision warning system, and a lane change control system, which help in reducing the risk of traffic accidents and performing safe driving, is base technology of intelligent vehicle technology, and more manpower and finances are becoming part of a variety of research and technical development. Particularly, when a driver operates a turn signal with the intention of changing a lane, a lane change control system capable of automatically changing a lane on which a vehicle is traveling controls the vehicle automatically and perform a lane change.

Such a lane change control system may perform a lane change by determining whether a speed, a location, and the like of a surrounding vehicle are suitable to perform the lane change, setting a control path for the lane change, and controlling steering torque along the control path.

However, a conventional lane change control system is unable to be applied in all road conditions for safe driving and is able to be used only on a specific road. In other words, the lane change control system is able to be activated on a limited-access road or a highway, but should be deactivated on a general road a pedestrian may enter for safety.

SUMMARY

An aspect of the present disclosure provides a lane change controller for a vehicle to increase the efficiency of safe driving by determining a condition of a road on which a vehicle is currently traveling to determine whether it is able to control a lane change and controlling the lane change, a system including the same, and a method thereof.

Furthermore, another aspect of the present disclosure provides a lane change controller for a vehicle to increase the convenience of a user by displaying the result of whether it is able to control a lane change, determined according to a condition on which a vehicle is currently traveling, on a screen such that the user recognizes the result, a system including the same, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lane change controller may include: a processor configured to determine whether it is possible for a vehicle to perform a lane change depending on a road condition, based on information about surrounding circumstances, a storage storing the result of determining whether it is possible to perform the lane change, the result being determined by the processor, and a display device configured to display the result of determining whether it is possible to perform the lane change.

The information about the surrounding circumstances may include at least one or more of global positioning system (GPS) receiving information, map information, and information sensing the periphery of the vehicle by a sensor of the vehicle.

The processor may be configured to determine whether it is able to determine a driving road based on GPS receiving information or information about map matching using map information and location information by a sensor of the vehicle.

The processor may be configured to determine a current road condition as a mode in which it is able to determine the driving road, when it is able to update the GPS receiving information or when it is able to perform the map matching.

The processor may be configured to determine whether it is possible to perform the lane change based on the result sensed by the sensor, when it is able to determine the driving road.

The processor may be configured to determine whether it is possible to perform the lane change using at least one or more of whether a current driving road is a general road, whether there is a pedestrian or a cyclist on the current driving road, whether there is a median strip, and the number of lanes of the driving road.

The processor may be configured to determine a current road condition as a mode in which it is impossible to perform the lane change, when the current driving road is the general road, when there is the pedestrian or the cyclist, or when the current driving road is a first lane.

The processor may be configured to determine a current road condition as a mode in which it is possible to perform the lane change, when the current driving road is a limited-access road or a highway, when there is no the pedestrian or the cyclist, when there is the median strip, or when the number of lanes of the driving road is greater than or equal to the predetermined number of lanes.

The processor may be configured to determine whether to control the lane change depending on the result of determining whether it is possible to perform the lane change, when receiving a lane change request from a user when the vehicle is traveling.

The processor may be configured to control the lane change, when a current road condition is a mode in which it is possible to perform the lane change and when receiving the lane change request from the user.

The processor may be configured to store the result of determining whether it is possible to perform the lane change in the storage, when the vehicle is temporarily turned off by an integrated starter generator (ISG) and control the lane change based on the result of determining whether it is possible to perform the lane change, the result being stored in the storage, when the vehicle is turned on.

According to another aspect of the present disclosure, a vehicle system may include: a GPS receiver configured to receive GPS information, a sensing module configured to provide information sensing the periphery of a vehicle, and a lane change controller configured to determine whether it is possible for the vehicle to perform a lane change based on the GPS information and the information sensing the periphery of the vehicle.

The lane change controller may be configured to display the result of determining whether it is possible to perform the lane change.

According to another aspect of the present disclosure, a lane change control method may include: receiving information about surrounding circumstances, determining whether it is possible to perform a lane change depending on a road condition, based on the information about the surrounding circumstances, and displaying the result of determining whether it is possible to perform the lane change.

The determining whether it is possible to perform the lane change may include determining a current road condition as a mode in which it is able to determine a driving road, when it is able to update GPS receiving information or when it is able to perform map matching using map information and location information by a sensor of a vehicle.

The determining whether it is possible to perform the lane change may include determining whether it is possible to perform the lane change using at least one or more of whether a current driving road is a general road, whether there is a pedestrian or a cyclist on the current driving road, whether there is a median strip, and the number of lanes of the driving road.

The determining whether it is possible to perform the lane change may include determining a current road condition as a mode in which it is impossible to perform the lane change, when the current driving road is the general road, when there is the pedestrian or the cyclist, or when the current driving road is a first lane.

The determining whether it is possible to perform the lane change may include determining a current road condition as a mode in which it is possible to perform the lane change, when the current driving road is a limited-access road or a highway, when there is no the pedestrian or the cyclist, when there is the median strip, or when the number of lanes of the driving road is greater than or equal to the predetermined number of lanes.

The method may further include determining whether to control the lane change depending on the result of determining whether it is possible to perform the lane change, when receiving a lane change request from a user when the vehicle is traveling.

The method may further include storing the result of determining whether it is possible to perform the lane change, when a vehicle is temporarily turned off by an ISG and controlling the lane change based on the previously stored result of determining whether it is possible to perform the lane change, when the vehicle is turned on.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
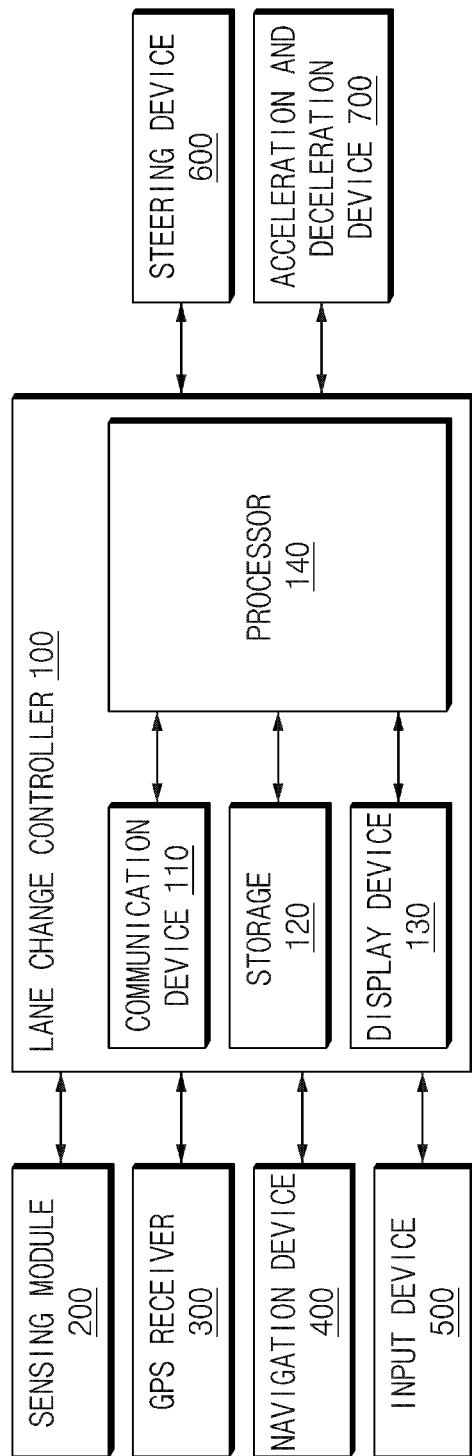
FIG. 1 is a block diagram illustrating a configuration of a vehicle system including a lane change controller in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the accompanying drawings. In adding reference denotations to elements of each drawing, although the same elements are displayed on a different drawing, it should be noted that the same elements have the same denotations. In addition, in describing some forms of the present disclosure, if it is determined that a detailed description of related well-known configurations or functions blurs the gist of some forms of the present disclosure, it will be omitted.

In describing elements of some forms of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

A lane change controller for a vehicle in some forms of the present disclosure may include an advanced driving assistance system (ADAS) for assisting in traveling, an autonomous system, or the like. Furthermore, in some forms of the present disclosure, when a user requests a lane change, the lane change controller may be driven as a lane change assist system for performing steering adjustment or vehicle-speed adjustment and assisting in a lane change function.

Hereinafter, a description will be given in detail of forms of the present disclosure with reference to FIGS. 1 to 5.

FIG. 1 is a block diagram illustrating a configuration of a vehicle system including a lane change controller in some forms of the present disclosure.

The vehicle system in some forms of the present disclosure may include a lane change controller 100, a sensing module 200, a global positioning system (GPS) receiver 300, a navigation device 400, an input device 500, a steering device 600, and an acceleration and deceleration device 700. The vehicle system of FIG. 1 may be loaded into the vehicle.

The lane change controller 100 may determine whether it is possible for the vehicle to perform a lane change based on GPS information received from the GPS receiver 300, map information received from the navigation device 400, and information sensing the periphery of the vehicle, sensed by the sensing module 200. Whether it is possible for the vehicle to perform the lane change may include a mode in which it is unable to determine a driving road, a mode in which it is possible to perform the lane change, or a mode in which it is impossible to perform the lane change.

The lane change controller 100 may be electrically connected with the sensing module 200, the GPS receiver 300, the navigation device 400, the input device 500, the steering device 600, the acceleration and deceleration device 700, and the like. The lane change controller 100 may control the sensing module 200, the GPS receiver 300, the navigation device 400, the input device 500, the steering device 600, and the acceleration and deceleration device 700 and may perform a variety of data processing and various arithmetic operations.

The lane change controller 100 of the vehicle may include a communication device 110, a storage 120, a display device 130, and a processor 140.

The communication device 110 may be a hardware device implemented with various electronic circuits to transmit and receive a signal over a wireless or wired connection. In some forms of the present disclosure, the communication device 110 may communicate with devices in the vehicle through controller area network (CAN) communication, local interconnect network (LIN) communication, or the like and may communicate with devices outside the vehicle through wireless communication.

The storage 120 may store information received from the sensing module 200, the GPS receiver 300, the navigation device 400, and the like and the result of determining whether it is possible to perform a lane change, determined by the processor 140.

The storage 120 may include at least one type of storage medium, such as a flash memory type memory, a hard disk type memory, a micro type memory, a card type memory (e.g., a secure digital SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The display device 130 may display the result of whether it is possible to perform a lane change. The result of whether it is possible to perform the lane change may include a mode in which it is unable to determine a driving road, a mode in which it is possible to perform the lane change, or a mode in which it is impossible to perform the lane change. The display device 130 may be implemented as a head-up display (HUD), a cluster, an audio video navigation (AVN), or the like. Furthermore, the display device 130 may receive a color input or the like directly from a user using a user setting menu (USM) of the cluster. Moreover, the display device 130 may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended splay, and a three-dimensional (3D) display. Some thereof may be implemented as transparent displays configured as a transparent type or a semi-transparent type to see the outside. Moreover, the display device 130 may be implemented as a touchscreen including a touch panel to be used as an input device other than an output device.

The processor 140 may be electrically connected with the communication device 110, the storage 120, or the display device 130 and may electrically control the respective components. The processor 140 may be an electrical circuit which executes instructions of software and may perform a variety of data processing and calculation described below. The processor 140 may be, for example, an electronic control unit (ECU) or a sub-controller loaded into the vehicle.

The processor 140 may determine whether it is possible for the vehicle to perform a lane change based on information about surrounding circumstances. The information about the surrounding circumstances may include at least one or more of GPS information received from the GPS receiver 300, map information received from the navigation device 400, and information sensing the periphery of the vehicle, sensed by the sensing module 200.

The processor 140 may determine whether it is able to determine a driving road based on GPS receiving information or information about map matching.

Meanwhile, when the reception of GPS receiving information is good and when it is able to perform map matching by map information of the navigation device 400 and location information by the sensing module 200, the processor 140 may determine that it is able to determine the driving road. In other words, although only one of whether GPS receiving information is received and whether it is able to perform map matching by map information (map data) of the navigation device 400 and location information by the sensing module 200 is satisfied, the processor 140 may determine that it is able to determine the driving road. For example, when the GPS receiving information is not temporarily updated, the processor 140 may determine whether it is able to determine the driving road using map matching.

In this case, when the map information includes data with respect to latitude and longitude using a geocentric coordinate system, the processor 104 may determine a more accurate vehicle location on a map by converting the map information into the vehicle-centric coordinate system upon map matching, comparing the map information converted into the vehicle-centric coordinate system with information based on the vehicle-centric coordinate system, obtained from the sensing module 200, correcting a relative location, and converting an absolute location of the geocentric coordinate system of the vehicle.

When it is able to determine the driving road, the processor 140 may determine whether it is possible to perform a lane change based on the result sensed by the sensing module 200.

The processor 140 may determine whether a current driving road is a general road, whether there is a pedestrian or a cyclist on the current driving road, whether there is a median strip, and the number of lanes of the driving road, using the result sensed by the sensing module 200. For example, the processor 140 may determine whether a type (e.g., a general road, a limited-access road, a highway, or the like) of a road, there is a pedestrian or a cyclist, and whether is there is a median strip, based on at least one or more of image data obtained using a camera, light detection and ranging (L. DAR) raw data, and radar data. Furthermore, the processor 140 may determine a type (e.g., a general road, a limited-access road, a highway, or the like) of a road on which the vehicle is currently traveling, based on map information (map data) stored in the navigation device 400 and GPS receiving information (location information). Furthermore, the processor 140 may determine a type of a road using information associated with recognizing a road sign based on a camera, information received from an infrastructure based on vehicle-to-infrastructure (V2I) communication, or the like.

Furthermore, the processor 140 may store shape information associated with a type of a road, a pedestrian, a cyclist, a median strip, or the like from image data obtained using the camera, LiDAR raw data, radar data, and the like in the storage 120 in advance. Hereafter, the processor 140 may determine whether a current driving road is a general road, whether there is a pedestrian or a cyclist on the current driving road, whether there is a median strip, and the number of lanes of the driving road, using the stored shape information or the like.

In this case, the general road may refer to a road, on which a pedestrian, a bicycle, a motorcycle, or the like may move, including traffic lights and crosswalks. The limited-access road may be a road on which only a car may travel. The highway may be a road where there is no traffic light and crosswalk and whether the vehicle may travel at less than a maximum speed over a minimum speed.

The processor 140 may determine whether it is possible to perform a lane change using at least one or more of whether the current driving road is a general road, whether there is a pedestrian or a cyclist on the current driving road, whether there is a median strip, and the number of lanes of the driving road.

In other words, when the current driving road is the general road, when there is the pedestrian or the cyclist, or when the current driving road is a first lane, the processor 140 may determine a current road condition as a mode in which it is impossible to perform the lane change.

Furthermore, when the current driving road is not the general road (e.g., when the current driving road is a limited-access road or a highway), when there is no the pedestrian or cyclist, when there is the median strip, or when the number of lanes of the driving road is greater than or equal to the predetermined number of lanes, the processor 140 may determine the current road condition as a mode in which it is possible to perform the lane change.

When receiving a lane change request from a user when the vehicle is traveling, the processor 140 may determine whether to control a lane change depending on the result of determining whether it is possible to perform the lane change. In other words, when the current road condition is the mode in which it is possible to perform the lane change and when receiving the lane change request from the user, the processor 140 may control the lane change.

When the vehicle is temporarily turned off by an integrated starter generator (ISG) upon stopping due to a traffic light, the processor 140 may store the result of determining whether it is possible to perform the lane change in the storage 120. When the vehicle is turned on to start, the processor 140 may control a lane change based on the result of determining whether it is possible to perform the lane change, stored in the storage 120. When the vehicle is turned on after being turned off completely by the user, a mode in which it is unable to determine a driving road may be set to a default.

As such, when the vehicle is located in an area, such as an underground parking lot or a tunnel, where the reception of a GPS signal is poor or where it is impossible to perform navigation map matching, when a pedestrian or a cyclist may be entered, and when there is no median strip or when the number of driving lanes is less than two lanes, the processor 140 may determine that it is impossible to perform a lane change. On the other hand, when the reception of the GPS signal is good or when it is possible to perform the navigation map matching, when the pedestrian or the cyclist may not be entered, and when there is the median strip or when the number of driving lanes is greater than or equal to the two lanes, the processor 140 may determine that it is possible to perform a lane change.

The sensor module 100 may be configured to obtain information associated with a type of a road on which the vehicle is currently traveling and an external object (e.g., a surrounding vehicle, a pedestrian, a cyclist, a motorcycle, a bicycle, a median strip, the number of lanes of the driving road, or the like) which is traveling on the same lane and a neighboring lane beside a lane on which the vehicle is traveling and sense surrounding circumstances. The information associated with the external object may include a location, a speed, a type, a movement direction, or the like of the external object.

To this end, the sensing module 100 may include at least one or more cameras, a radar, a LiDAR, an ultrasonic sensor, an acceleration sensor, a yaw rate sensor, a torque sensor, a wheel speed sensor, and/or the like. Furthermore, at least one or more sensors may be loaded into the front, the rear, or left and right sides of the vehicle. Furthermore, the sensing module 100 may perform sensing at a predetermined period and may provide the sensed result the processor 140.

The GPS receiver 300 may receive a GPS signal from a GPS satellite and may deliver the received GPS signal to the lane change controller 100. Thus, the lane change controller 100 may determine a location of a host vehicle using the GPS signal.

The navigation device 400 may provide map information or the like according to a location and destination of the vehicle to the lane change controller 100.

The input device 500 may be configured to receive a lane change command from the user. In some forms of the present disclosure, the input device 500 may include a turn signal level, a switch, a button, or the like capable of receiving a user input for a lane change.

The steering device 600 may be configured to control a steering angle of the vehicle and may include a steering wheel, an actuator interlocked with the steering wheel, and a controller for controlling the actuator.

The acceleration and deceleration device 700 may be configured to control a speed of the vehicle and may include a throttle, a brake, and an actuator interlocked with the throttle and the brake, and a controller for controlling the actuator.

As such, some forms of the present disclosure may increase the convenience of the user and may perform safe driving by determining a state where it is able to perform a lane change based on a road condition, displaying whether it is possible to perform a lane change such that the user recognizes it, and automatically controlling the lane change when receiving a lane change request from the user in the state where it is possible to perform the lane change.

Figure 2:
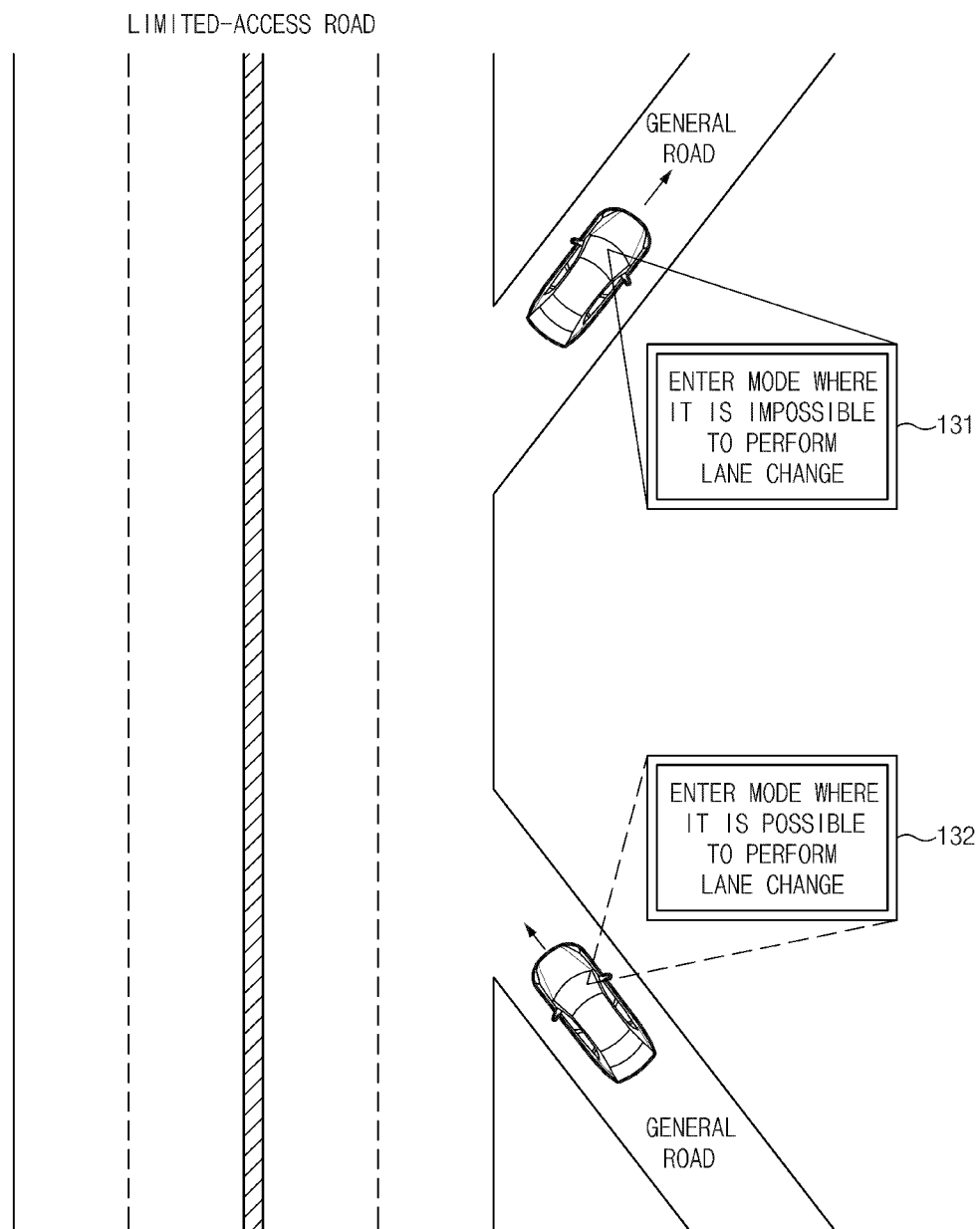
FIG. 2 is a drawing illustrating a lane change control method as a road condition is determined in one form of the present disclosure.

FIG. 2 is a drawing illustrating a lane change control method as a road condition is determined, in some forms of the present disclosure.

Referring to FIG. 2, when a vehicle travels on a general road and then enters a limited-access road, a processor 140 of FIG. 1 may determine a change in road condition to determine whether it is possible to perform a lane change and may display the result on a display device 130 of the vehicle. In FIG. 2, when the vehicle enters the limited-access road from the general road, the processor 140 may display a message 132 for "entering a mode where it is possible to perform a lane change" on the display device 130. When the vehicle exits from the limited-access road to the general road, the processor 140 may determine whether it is possible to perform a lane change depending on a change in road condition and may display a message 131 for "entering a mode where it is impossible to perform a lane change" on the display device 130.

Figure 3:
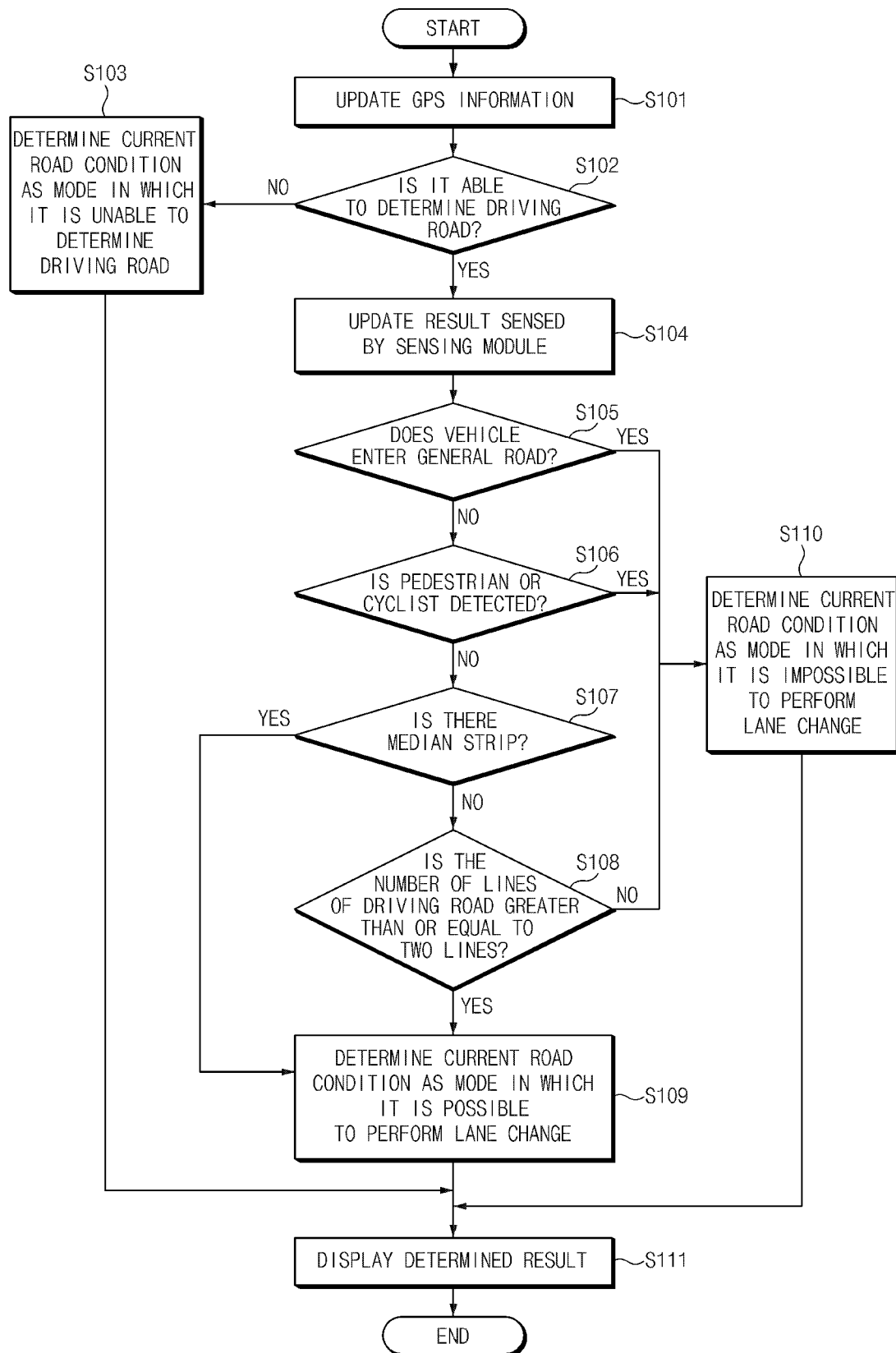
FIG. 3 is a flowchart illustrating a method for determining a road condition for controlling a lane change of a vehicle in one form of the present disclosure.

Hereinafter, a description will be given in detail of a method for determining a road condition for controlling a lane change of a vehicle in some forms of the present disclosure. FIG. 3 is a flowchart illustrating a method for determining a road condition for controlling a lane change of a vehicle in some forms of the present disclosure.

Hereinafter, it is assumed that a lane change controller 100 of FIG. 1 performs a process of FIG. 3. Furthermore, in a description of FIG. 3, an operation described as being performed by the lane change controller 100 may be understood as being controlled by a processor 140 of the lane change controller 100.

Referring to FIG. 3, in operation S101, the lane change controller 100 may receive a GPS signal via a GPS receiver 200 of FIG. 1 and may update GPS information. In operation S102, the lane change controller 100 may determine whether it is able to determine a condition of a driving road based on the updated result of the GPS information. In this case, the lane change controller 100 may enter a mode in which it is unable to determine a driving road, which is a default mode, as soon as a vehicle is turned on and may periodically update GPS information. When the driving of the vehicle starts, the lane change controller 100 may determine whether the GPS information is normally updated.

In other words, in operation S103, when there is the reason why the reception of a GPS signal is poor or why it is possible to match map information of a navigation device 400 of FIG. 1, the lane change controller 100 may determine a current road condition is a mode in which it is unable to determine a driving road, which is a state where it is impossible to determine a condition of a road on which the vehicle is current traveling. When GPS information is updated in a place, such as an underground parking lot, a place under a bridge, or a tunnel, where the reception of a GPS signal is poor, since it is difficult to determine a driving road, the lane change controller 100 may determine the current road condition as the mode in which it is unable to determine the driving road. The lane change controller 100 may recognize information associated with a lane, a road marker, and a traffic sign in advance by means of a sensing module 200 of FIG. 1 and may determine a condition of a road on which the vehicle is currently traveling, using a detailed map which records the recognized information.

In operation S111, the lane change controller 100 may display a mode in which it is unable to determine the driving road on the current driving road on a screen. As such, the lane change controller 100 may display the state where it is unable to determine the driving road on a display device 130 of FIG. 1, such that a user knows the reason why it is impossible to perform a lane change.

Meanwhile, when the reception of the GPS signal is good and when it is possible to match the map information of the navigation device 400, in operation S104, the lane change controller 100 may determine that it is able to determine a condition of a road on which the vehicle is traveling and may update the result sensed by the sensing module 200.

In operation S105, the lane change controller 100 may determine whether the road on which the vehicle is currently traveling is a general road based on the updated result sensed by the sensing module 200. In this case, the lane change controller 100 may determine whether the road on which the vehicle is currently traveling is the general road based on map information provided from the navigation device 400. The lane change controller 100 may determine whether the vehicle enters the general road based on information indicating that the vehicle enters or exit from an interchange (IC) or junction (JC) while driving.

When the road on which the vehicle is currently traveling is the general road, in operation S110, the lane change controller 100 may determine the current road condition as a mode in which it is impossible to perform a lane change. When the lane change controller 100 is temporarily turned off by an ISG because the vehicle stops due to a traffic light when the vehicle travels on the general road, it may store information associated with a mode in which it is impossible to perform a lane change or a mode in which it is possible to perform a lane change in a storage 120 of FIG. 1. When the vehicle restarts at a later time, the lane change controller 100 may control a lane change based on the mode information stored in the storage 120.

On the other hand, when the road on which the vehicle is currently traveling is not the general road, in operation S106, the lane change controller 100 may determine whether there is a pedestrian or a cyclist within the road on which the vehicle is currently traveling, based on the result sensed by the sensing module 200. When there is the pedestrian or the cyclist within the road on which the vehicle is currently traveling, in operation S110, the lane change controller 100 may determine the current road condition as the mode in which it is impossible to perform the lane change. In this case, the lane change controller 100 may determine there is the pedestrian or the cyclist based on information received from a camera or a LiDAR.

Meanwhile, when the road on which the vehicle is currently traveling is not the general road and when there is no the pedestrian or cyclist within the road on which the vehicle is currently traveling, in operation S107, the lane change controller 100 may determine there is a median strip on the road where the vehicle is currently traveling, based on the result sensed by the sensing module 200. The lane change controller 100 may determine whether there is a median strip (a guardrail) based on map information received from the navigation device 400 or the sensed result received from the camera, a radar, the LiDAR, or the like.

When the road on which the vehicle is currently traveling is not the general road, when there is no the pedestrian or cyclist within the road on which the vehicle is currently traveling, and there is the median strip on the road where the vehicle is currently traveling, in operation S109, the lane change controller 100 may determine the road on which the vehicle is currently traveling as a highway or limited-access road where it is able to drive an autonomous system or a vehicle driving assist system to determine the current road condition as a mode in which it is possible to perform a lane change. Thereafter, in operation S111, the lane change controller 100 may display the mode in which it is possible to perform the lane change on the road where the vehicle is currently traveling, on the screen.

Meanwhile, when there is no the median strip on the road where the vehicle is currently traveling, in operation S108, the lane change controller 100 may determine whether the number of lanes of the road on which the vehicle is currently traveling is greater than or equal to two lines based on the result sensed by the sensing module 200. When the number of the lanes of the road on which the vehicle is currently traveling is greater than or equal to the two lines, in operation S109, the lane change controller 100 may determine the current road condition as the mode in which it is possible to perform the lane change. Thereafter, in operation S111, the lane change controller 100 may display the mode in which it is possible to perform the lane change from the road on which the vehicle is currently traveling, on the screen. In this case, the lane change controller 100 may recognize the number of lanes based on image information of the camera.

On the other hand, when the number of the lanes of the road on which the vehicle is currently traveling is less than the two lines, in operation S110, the lane change controller 100 may determine the current road condition as the mode in which it is impossible to perform the lane change. In operation S111, the lane change controller 100 may display the mode in which it is impossible to perform the lane change from the road on which the vehicle is currently traveling, on the screen.

As such, some forms of the present disclosure may classify and determine a mode in which it is impossible to determine a driving road, a mode in which it is impossible to perform a lane change, and a mode in which it is possible to perform a lane change and may display the determined result on the screen, such that the user recognizes the reason why the lane change controller is impossible. In FIG. 3, some forms of the present disclosure are exemplified as the lane change controller 100 sequentially determines conditions, for example, whether the vehicle enters the general road, whether the pedestrian or the cyclist is detected, there is the median strip, and the number of the lanes of the driving road. However, forms of the present disclosure are not limited thereto. For example, the lane change controller 100 may consider the conditions, for example, whether the vehicle enters the general road, whether the pedestrian or the cyclist is detected, there is the median strip, and the number of the lanes of the driving road, in parallel, to determine whether it is possible to perform a lane change. For example, the lane change controller 100 may determine whether it is possible to perform a lane change as at least one or more of the conditions, for example, whether the vehicle enters the general road, whether the pedestrian or the cyclist is detected, there is the median strip, and the number of the lanes of the driving road, are satisfied.

Figure 4:
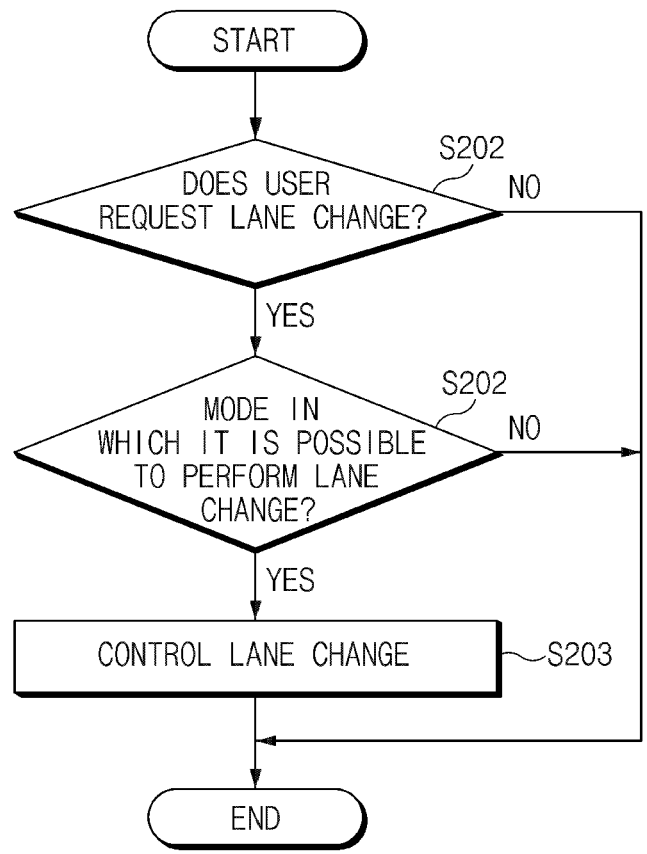
FIG. 4 is a flowchart illustrating a lane change control method for a vehicle according to the result of determining whether it is possible to perform a lane change based on a road condition of FIG. 3.

Hereinafter, a description will be given in detail of a lane change control method for a vehicle according to the result of determining whether it is possible to perform a lane change based on a road condition of FIG. 3. FIG. 4 is a flowchart illustrating a lane change control method for a vehicle according to the result of determining whether it is possible to perform a lane change based on a road condition of FIG. 3.

Hereinafter, it is assumed that a lane change controller 100 of FIG. 1 performs a process of FIG. 4. Furthermore, in a description of FIG. 4, an operation described as being by the lane change controller 100 may be understood as being controlled by a processor 140 of the lane change controller 100.

Referring to FIG. 4, When a vehicle is traveling, when receiving a lane change request from a user in operation S201, in operation S202, the lane change controller 100 may determine whether a current road condition is a mode in which it is possible to perform a lane change. In this case, the lane change controller 100 may determine the lane change request from the user via an input device 500 of FIG. 1, for example, a turn signal level, a switch, a button, or the like. In other words, the lane change controller 100 may determine the lane change request by receiving a command to perform a lane change in a left or right direction via the input device 500.

Furthermore, the lane change controller 100 may periodically determine and store whether the current road condition is the mode in which it is possible to perform the lane change through the process of FIG. 3. When receiving the lane change request from the user, in operation S203, the lane change controller 100 may control a lane change based on the previously stored result of determining whether the current road condition is the mode in which it is possible to perform the lane change. When the current road condition is not the mode in which it is possible to perform the lane change, the lane change controller 100 may end the process without performing the lane change.

As such, some forms of the present disclosure may increase the convenience of the user by determining an operation, capable of automatically and safely performing a lane change function, depending on a condition of a road on which the vehicle is traveling and notifying the user whether it is possible to perform a lane change. Moreover, some forms of the present disclosure may increase the safety and availability of the system by determining whether it is possible to perform a lane change depending on a condition of a road on which the vehicle is currently traveling and automatically performing the lane change function depending on the result.

Figure 5:
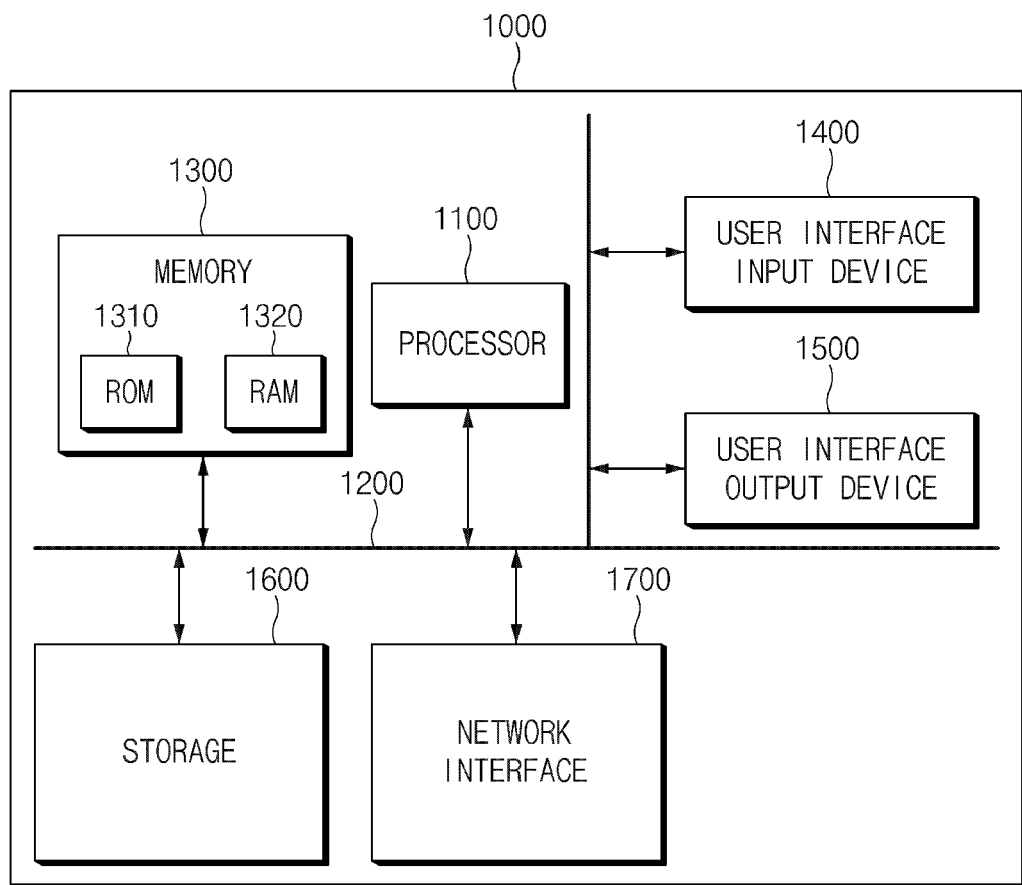
FIG. 5 is a block diagram illustrating a configuration of a computing system in one form of the present disclosure.

FIG. 5 is a block diagram illustrating a configuration of a computing system in some forms of the present disclosure.

Referring to FIG. 5, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with some forms of the present disclosure disclosed in the specification may be directly implemented with a hardware module, a software module, or combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM).

An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The technology of the present disclosure may determine a condition of a road on which the vehicle is currently traveling to determine whether it is possible to control a lane change and may control the lane change, thus, whenever a condition of a driving road is changed, recognizing it to safely control the lane change.

Furthermore, the technology of the present disclosure may increase the convenience of the user by displaying the result of whether it is possible to control the lane change, determined according to a condition of a road on which the vehicle is currently traveling, on the screen such that the user recognize the result.

In addition, various effects directly or indirectly ascertained through the present disclosure may be provided.

Hereinabove, although the present disclosure has been described with reference to some forms of the present disclosure and the accompanying drawings, the present disclosure is not limited thereto, but may be variously modified and altered by those skilled in the art to which the present disclosure pertains without departing from the spirit and scope of the present disclosure claimed in the following claims.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A lane change controller, comprising:
    a processor configured to determine whether a vehicle can perform a lane change corresponding to a road condition based on information about surrounding circumstances;
    a storage configured to store a result of the determination that the vehicle can perform the lane change corresponding to the road condition based on the information about the surrounding circumstances; and
    a display configured to display the result of the determination,
    wherein the result of the determination includes a mode in which it is unable to determine a driving road, a mode in which it is possible to perform the lane change, or a mode in which it is impossible to perform the lane change.

2. The lane change controller of claim 1, wherein the information about the surrounding circumstances comprises at least one of global positioning system (GPS) receiving information, map information, or information sensing the periphery of the vehicle by a sensor of the vehicle.

3. The lane change controller of claim 1, wherein the processor is configured to:
    determine a status of a driving road based on the GPS receiving information or information about map matching that uses the map information and location information by a sensor.

4. The lane change controller of claim 3, wherein the processor is configured to:
    determine the status of the driving road, when the GPS receiving information is updated or the map matching is performed.

5. The lane change controller of claim 3, wherein the processor is configured to:
    determine whether to perform the lane change based on a result sensed by the sensor when the status of the driving road is determined.

6. The lane change controller of claim 5, wherein the processor is configured to:
    determine whether to perform the lane change based on at least one of whether a current driving road is a general road, whether a pedestrian or a cyclist is on the current driving road, whether there is a median strip, or a number of lanes of the driving road.

7. The lane change controller of claim 6, wherein the processor is configured to:
    determine not to perform the lane change when the current driving road is the general road, when the pedestrian or the cyclist is on the current driving road, or when the current driving road is a first lane.

8. The lane change controller of claim 6, wherein the processor is configured to:
    determine to perform the lane change, when the current driving road is a limited-access road or a highway, when the pedestrian or the cyclist is not on the current driving road, when there is the median strip, or when the number of lanes of the driving road is greater than or equal to a predetermined number of lanes.

9. The lane change controller of claim 1, wherein the processor is configured to:
    determine whether to control the lane change based on the result of determination when a lane change request is received from the vehicle.

10. The lane change controller of claim 9, wherein the processor is configured to:
    control the lane change when the lane change is determined to perform, and when the lane change request is received from the vehicle.

11. The lane change controller of claim 9, wherein the processor is configured to:
    store the result of the determination in the storage when the vehicle is temporarily turned off by an integrated starter generator (ISG); and
    control the lane change based on the result of determination, when the vehicle is turned on.

12. A vehicle system, comprising:
    a GPS receiver configured to receive GPS information;
    a sensing module configured to provide information regarding sensing a periphery of a vehicle; and
    a lane change controller configured to determine whether to perform a lane change based on the GPS information and the information regarding sensing the periphery of the vehicle,
    wherein the lane change controller is further configured to:
    display a result of determination that the lane change is performed, wherein the result of the determination includes a mode in which it is unable to determine a driving road, a mode in which it is possible to perform the lane change, or a mode in which it is impossible to perform the lane change.

13. A lane change control method, the method comprising:
    receiving information about surrounding circumstances;
    determining whether to perform a lane change corresponding to a road condition based on the information about the surrounding circumstances; and
    displaying a result of the determination of whether to perform the lane change, wherein the result of the determination includes a mode in which it is unable to determine a driving road, a mode in which it is possible to perform the lane change, or a mode in which it is impossible to perform the lane change.

14. The method of claim 13, wherein determining whether to perform the lane change comprises:
determining a status of a driving road when GPS receiving information or map matching information is updated, wherein the map matching information uses map information and location information by a sensor of a vehicle.

15. The method of claim 13, wherein determining whether to perform the lane change comprises:
determining whether to perform the lane change based on at least one of whether a current driving road is a general road, whether a pedestrian or a cyclist is on the current driving road, whether there is a median strip, or a number of lanes of the driving road.

16. The method of claim 15, wherein determining whether to perform the lane change comprises:
determining not to perform the lane change when the current driving road is the general road, when the pedestrian or the cyclist is on the current driving road, or when the current driving road is a first lane.

17. The method of claim 15, wherein determining whether to perform the lane change comprises:
determining to perform the lane change when the current driving road is a limited-access road or a highway, when the pedestrian or the cyclist is not on the current driving road, when there is the median strip, or when the number of lanes of the driving road is greater than or equal to a predetermined number of lanes.

18. The method of claim 13, wherein the method further comprises:
determining whether to control the lane change based on the result of the determination when a lane change request is received from the vehicle.

19. The method of claim 13, wherein the method further comprises:
storing the result of determination when the vehicle is temporarily turned off by an integrated starter generator (ISG); and
controlling the lane change based on the stored result of determination when the vehicle is turned on.

* * * * *